United States Patent
Tanaka et al.

(10) Patent No.: US 8,971,633 B2
(45) Date of Patent: Mar. 3, 2015

(54) CONTENT RETRIEVAL TO FACILITATE RECOGNIZING CONTENT DETAILS OF A MOVING IMAGE

(75) Inventors: Kazumasa Tanaka, Kanagawa (JP); Kenji Tanaka, Kanagawa (JP); Yoshihiro Takahashi, Kanagawa (JP)

(73) Assignee: Sony Corporation, Tokyo (JP)

(*) Notice: Subject to any disclaimer, the term of this patent is extended or adjusted under 35 U.S.C. 154(b) by 173 days.

(21) Appl. No.: 13/639,012

(22) PCT Filed: Mar. 30, 2011

(86) PCT No.: PCT/JP2011/058022
§ 371 (c)(1),
(2), (4) Date: Oct. 2, 2012

(87) PCT Pub. No.: WO2011/125744
PCT Pub. Date: Oct. 13, 2011

(65) Prior Publication Data
US 2013/0170753 A1  Jul. 4, 2013

(30) Foreign Application Priority Data
Apr. 9, 2010  (JP) .................................. 2010-090610

(51) Int. Cl.
*G06K 9/46* (2006.01)
*G06F 17/30* (2006.01)
(Continued)

(52) U.S. Cl.
CPC .... *G06F 17/30244* (2013.01); *G06F 17/30256* (2013.01); *G11B 27/105* (2013.01);
(Continued)

(58) Field of Classification Search
None
See application file for complete search history.

(56) References Cited

U.S. PATENT DOCUMENTS

| 5,537,528 A | 7/1996 | Takahashi et al. |
| 2007/0043763 A1 | 2/2007 | Nagamine et al. |

(Continued)

FOREIGN PATENT DOCUMENTS

| JP | 2000 251450 | 9/2000 |
| JP | 2006-39753 | 2/2006 |

(Continued)

OTHER PUBLICATIONS

Search Report issued in corresponding European application No. 11765644.7 dated Feb. 7, 2014.

(Continued)

*Primary Examiner* — Bhavesh Mehta
*Assistant Examiner* — Siamak Harandi
(74) *Attorney, Agent, or Firm* — Frommer Lawrence & Haug LLP; William S. Frommer; Ellen Marcie Emas

(57) ABSTRACT

An apparatus, a content retrieval method and a program facilitate recognizing content details of a moving image by displaying a retrieval result for each of a plurality of images. A metadata extracting unit extracts metadata of a representative image from content supplied from a content input unit and stores the metadata in a metadata database. An image feature quantity extracting unit extracts image feature quantity from content and stores it in an image feature quantity database while extracting image feature quantity from a retrieval image. A retrieving unit compares the image feature quantity of the retrieval image with the image feature quantity stored in the image feature quantity database and specifies a still image which is similar to the retrieval image. An output unit reads metadata of the content, generates display data necessary for performing timeline displaying, and generates display data for displaying a retrieval result on a timeline.

7 Claims, 13 Drawing Sheets

(51) Int. Cl.
- *G11B 27/10* (2006.01)
- *G11B 27/28* (2006.01)
- *G11B 27/34* (2006.01)
- *H04N 7/173* (2011.01)
- *H04N 21/234* (2011.01)
- *H04N 21/482* (2011.01)
- *H04N 21/81* (2011.01)
- *H04N 21/84* (2011.01)
- *H04N 21/4402* (2011.01)
- *H04N 21/472* (2011.01)
- *H04N 21/845* (2011.01)

(52) U.S. Cl.
CPC ............... *G11B 27/28* (2013.01); *G11B 27/34* (2013.01); *H04N 7/17318* (2013.01); *H04N 21/23418* (2013.01); *H04N 21/4828* (2013.01); *H04N 21/8153* (2013.01); *H04N 21/84* (2013.01); *H04N 21/440263* (2013.01); *H04N 21/47217* (2013.01); *H04N 21/8456* (2013.01); *G06F 17/3084* (2013.01); *G06F 17/30802* (2013.01)
USPC .......................................................... 382/190

(56) References Cited

U.S. PATENT DOCUMENTS

| | | |
|---|---|---|
| 2007/0074244 A1* | 3/2007 | Miyamori ........................ 725/34 |
| 2007/0237360 A1 | 10/2007 | Irie et al. |
| 2008/0256450 A1* | 10/2008 | Takakura et al. .............. 715/721 |
| 2008/0263448 A1* | 10/2008 | Oppenheimer ................ 715/719 |
| 2009/0083814 A1* | 3/2009 | Sekine et al. .................. 725/104 |

FOREIGN PATENT DOCUMENTS

| | | |
|---|---|---|
| JP | 2006-510240 | 3/2006 |
| JP | 2007-52564 | 3/2007 |
| JP | 2007-81858 | 3/2007 |
| JP | 2007-281858 | 10/2007 |
| JP | 2007-323319 | 12/2007 |
| JP | 2008-185626 | 8/2008 |
| JP | 2009-88602 | 4/2009 |
| JP | 2009-163644 | 7/2009 |

OTHER PUBLICATIONS

Office Action issued in corresponding Chinese application No. 2011800173185 issued Oct. 15, 2014 and the English Translation.

* cited by examiner

CONTENT RETRIEVAL TO FACILITATE RECOGNIZING CONTENT DETAILS OF A MOVING IMAGE

TECHNICAL FIELD

The present invention relates to an apparatus and a method of content retrieval and a program, and in particular, an apparatus and a method of content retrieval and a program with which content details of a moving image can be easily recognized by displaying a retrieval result for each of a plurality of images.

BACKGROUND ART

Recently, there have been proposed technologies of analyzing and retrieving video (moving image) content. For displaying such an analysis result and a retrieval result, displaying methods being visually recognizable such that content is displayed on a timeline, for example, have been contrived in addition to displaying numerical values and images as-is.

That is, to check all details of content of a moving image, specific reproduction time is required owing to necessity to reproduce the content. It is preferable to easily recognize the details of the content without taking such time.

In the related art, there has been known an example to display a waveform image such as variation of an audio signal and a brightness value of pixels as timeline displaying.

Further, there have been proposed a method to display an image of the first frame and an image of the last frame of each scene which structures content and a technology to enable to view image digest scenes on a multi-screen (e.g., see Patent Document 1).

Further, there has been proposed to record an index-use moving image sub-sampled from a normal moving image concurrently with recording of the normal image and to perform reproduction of the index-use moving image for a selected moving image, for example, when any of index-displayed images is selected by a user (e.g., see Patent Document 2).

CITATION LIST

Patent Documents

Patent Document 1: Japanese Patent Application Laid-Open No. 7-67073
Patent Document 2: Japanese Patent Application Laid-Open No. 2001-238154

SUMMARY OF THE INVENTION

Problems to be Solved by the Invention

However, in the related art, there is a problem that a user cannot easily find a scene in which a desired image is included or a characteristic scene desired by the user.

For example, even though retrieval of content can be performed as an individual image being an image to be retrieved, it is not possible to perform retrieval of a part where a plurality of images is sequentially displayed, comparison of a temporal ratio of displaying a desired image in the content with a temporal ratio of displaying another image, and the like.

Further, for example, in a method of displaying an image of the first frame or the like of each scene, displaying becomes complicated in a case of a temporally long content. Accordingly, it is quite unlikely that content details become easily recognizable owing to such displaying.

Further, in a case of a method to display index images on a multi-screen or a method to reproduce an index moving image, it is difficult to recognize what kind of image exists at which part (temporal position) of a video content.

To address the above situation, the present invention is devised to facilitate recognition of content details of a moving image by displaying retrieval results respectively for a plurality of images.

Solutions to Problems

An aspect of the present invention is a content retrieval apparatus, including: retrieval image input means which receives input of a plurality of retrieval images being still images; image feature quantity extracting means which extracts image feature quantity of each of the plurality of retrieval images with a predetermined method; similarity degree calculation means which calculates a similarity degree of content of a moving image between the image feature quantity previously extracted from a still image of a frame structuring the content and the image feature quantity of each of the retrieval images; specifying means which specifies a frame of the still image being similar to each of the retrieval images by comparing the calculated similarity degree with a predetermined threshold value; and timeline displaying means which generates display data for performing timeline displaying by displaying the content on a time axis along with information indicating a temporal position of the frame of the still image being similar to each of the retrieval images based on the specified frame and metadata which is previously extracted from the content.

The timeline displaying means may generate display data for displaying a screen having a retrieval image display unit which displays a list of the plurality of retrieval images and a timeline display unit which displays the content on a timeline, the plurality of retrieval images may be displayed at the retrieval image display unit while being surrounded respectively by display frames in mutually different colors, and information indicating a temporal position of the frame of the still image being similar to each of the retrieval images may be displayed at the timeline display unit as a color bar in the same color as the color of the display frame.

The timeline displaying means may display each of a plurality of pieces of content with the timeline displaying at the timeline display unit on a single screen, and information indicating a temporal position of the frame of the still image being similar to each of the retrieval images for each of the plurality of pieces of content may be displayed as a color bar in the same color as the color of the display frame.

The timeline displaying means may generate display data for displaying a screen further having a moving image display unit which displays a moving image obtained by reproducing the content in a case that reproduction of the content displayed with the timeline displaying is instructed.

The timeline displaying means may specify scenes structuring the content based on information of scene change points of the content included in the metadata, and display the content on a timeline in such a manner that figures indicating the respective scenes are displayed while being associated with temporal length of the scenes, with the horizontal or vertical direction of a screen being the time axis.

The timeline displaying means may display the content on a timeline while the figures indicating the scenes are displayed respectively in representative color of the scenes specified with a predetermined method.

An aspect of the present invention is a content retrieval method, including the steps of: receiving input of a plurality of retrieval images being still images with retrieval image input means; extracting image feature quantity of each of the plurality of retrieval images with a predetermined method with image feature quantity extracting means; calculating a similarity degree of content of a moving image between the image feature quantity previously extracted from a still image of a frame structuring the content and the image feature quantity of each of the retrieval images with similarity degree calculation means; specifying a frame of the still image being similar to each of the retrieval images by comparing the calculated similarity degree with a predetermined threshold value with specifying means; and generating display data for performing timeline displaying by displaying the content on a time axis along with information indicating a temporal position of the frame of the still image being similar to each of the retrieval images based on the specified frame and metadata which is previously extracted from the content with timeline displaying means.

An aspect of the present invention is a program for causing a computer to function as a content retrieval apparatus, the apparatus including: retrieval image input means which receives input of a plurality of retrieval images being still images; image feature quantity extracting means which extracts image feature quantity of each of the plurality of retrieval images with a predetermined method; similarity degree calculation means which calculates a similarity degree of content of a moving image between the image feature quantity previously extracted from a still image of a frame structuring the content and the image feature quantity of each of the retrieval images; specifying means which specifies a frame of the still image being similar to each of the retrieval images by comparing the calculated similarity degree with a predetermined threshold value; and timeline displaying means which generates display data for performing timeline displaying by displaying the content on a time axis along with information indicating a temporal position of the frame of the still image being similar to each of the retrieval images based on the specified frame and metadata which is previously extracted from the content.

In an aspect of the present invention, input of retrieval images being still images is received, image feature quantity of each of the plurality of retrieval images is extracted with a predetermined method, a similarity degree of content of a moving image between the image feature quantity previously extracted from a still image of a frame structuring the content and each image feature quantity of the retrieval images is calculated, a frame of the still image being similar to each of the retrieval images is specified by comparing the calculated similarity degree with a predetermined threshold value, and display data for performing timeline displaying by displaying the content on a time axis along with information indicating a temporal position of the frame of the still image being similar to each of the retrieval images is generated based on the specified frame and metadata which is previously extracted from the content.

Effects of the Invention

According to the present invention, content details of a moving image can be recognized more easily.

MODE FOR CARRYING OUT THE INVENTION

In the following, embodiments of the present invention will be described with reference to the drawings.

Figure 1:
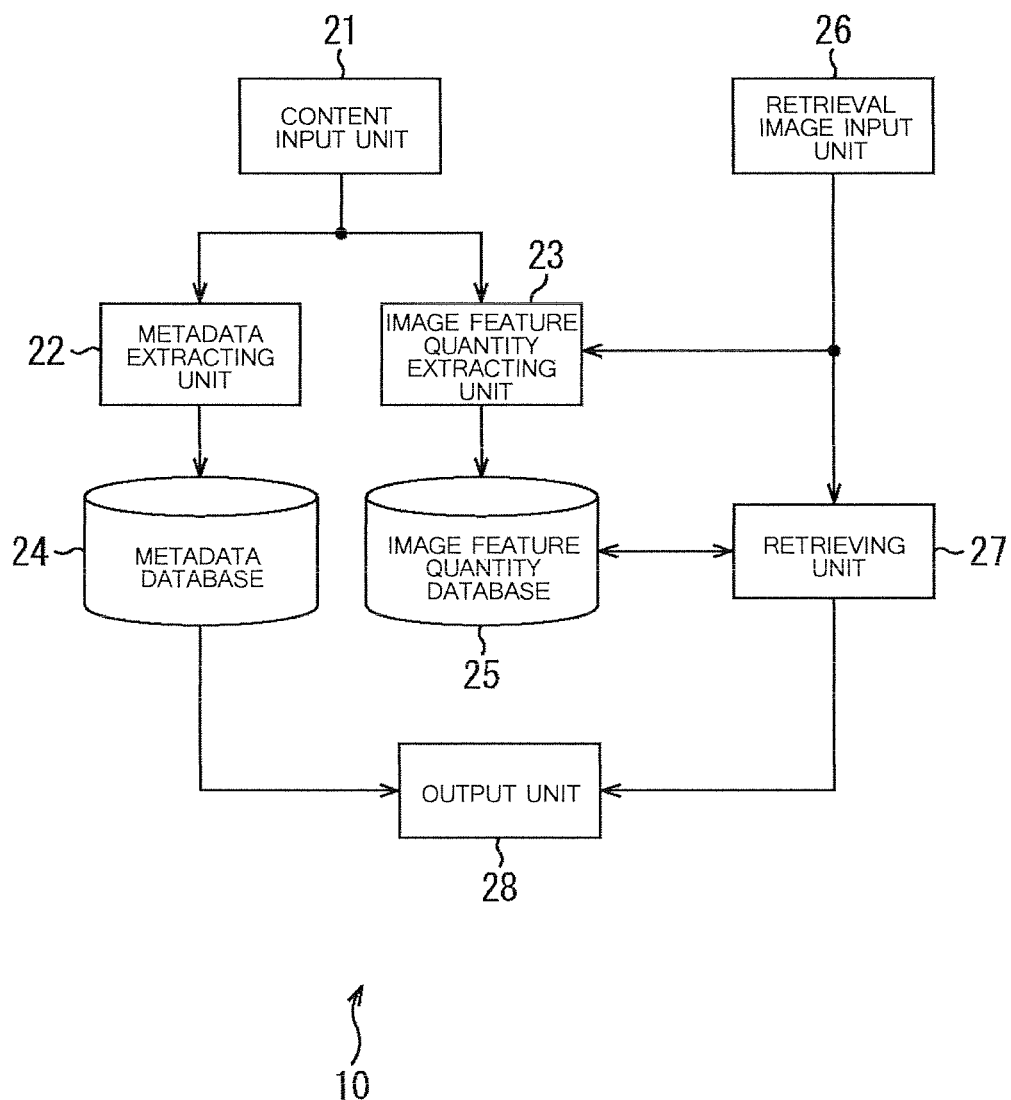
FIG. 1 is a block diagram illustrating a structural example of a content processing apparatus according to an embodiment of the present invention.

FIG. 1 is a block diagram illustrating a structural example of a content processing apparatus according to an embodiment of the present invention.

A content processing apparatus 10 performs timeline displaying of an input moving image content and performs timeline displaying of a retrieval result as retrieving a predetermined image in the content as required.

As illustrated in the drawing, the content processing apparatus 10 is provided with a content input unit 21, a metadata extracting unit 22, an image feature quantity extracting unit 23, a metadata database 24, and an image feature quantity database 25. Further, the content processing apparatus 10 is provided with a retrieval image input unit 26, a retrieving unit 27, and an output unit 28.

The content input unit 21 receives input of content data. As described above, the content is a moving image content and includes audio, a caption and the like as required. For example, the content is content which is edited as a part of a program to be broadcasted.

The metadata extracting unit 22 analyzes data of the content supplied from the content input unit 21 and extracts metadata from the content. Here, for example, the metadata denotes information regarding scene change points, information regarding time to be required for performing later-mentioned timeline displaying, information of representative images and the like of the content.

The representative images of the content included in the metadata are set to be an image (still image) of a frame corresponding to a scene having a largest audio signal level among respective scenes structuring the content. The representative image is to be extracted with a previously determined method. Information such as data of the representative image and a frame number of the frame corresponding to the representative image is also extracted by the metadata extracting unit.

The metadata extracted by the metadata extracting unit is to be stored in the metadata database 24 as being associated with content identification information.

The image feature quantity extracting unit 23 is configured to analyze the content data supplied from the content input unit 21 and to extract image feature quantity from the content. Here, the image feature quantity denotes information to be used for obtaining a similarity degree to a retrieval image in a process of the retrieving unit 27 described later. For example, the image feature quantity denotes information and the like in which still images by the amount of one frame structuring the content are divided respectively into a plurality of predetermined areas as providing a representative color to each area. Further, the image feature quantity may be information of histogram of pixel values of still images by the amount of one frame, and the like.

The image feature quantity extracted by the image feature quantity extracting unit 23 is to be stored in the image feature quantity database 25 as being associated with the content identification information and the frame number, for example.

Further, the image feature quantity extracting unit 23 is configured to extract image feature quantity similarly from the retrieval image input from the retrieval image input unit 26.

The retrieval image input unit 26 is configured to receive input of a retrieval image being a still image. For example, the retrieval image is image which is arbitrarily selected by a user and is input for retrieving an image which is similar to the retrieval image out of the content input from the content input unit 21.

The retrieving unit 27 compares the image feature quantity of the retrieval image extracted by the image feature quantity extracting unit 23 and the image feature quantity stored in the image feature quantity database 25 with a predetermined method. Accordingly, the similarity degree between the image feature quantity of the retrieval image and image feature quantity of each still image by the amount of one frame structuring the content stored in the image feature quantity database 25 is to be calculated as a numerical value.

For example, the retrieving unit 27 specifies still images with image feature quantity respectively having a value of the similarity degree to the image feature quantity of the retrieval image being a predetermined threshold value or larger and supplies the frame number and the like of the still images to the output unit 28.

The output unit 28 is configured to read metadata of the content from the metadata database 24 and to generate display data which is required for performing timeline displaying of the content.

Further, the output unit 28 reads metadata of the content from the metadata database 24 and generates display data for performing timeline displaying of a retrieval result based on the frame number of the still image supplied from the retrieving unit 27 and the read metadata.

Here, the display data output from the output unit 28 is supplied to a display (not illustrated) or the like and is displayed as an image as described later.

Next, description is performed on an example of timeline displaying of content with the content processing apparatus 10.

Figure 2:
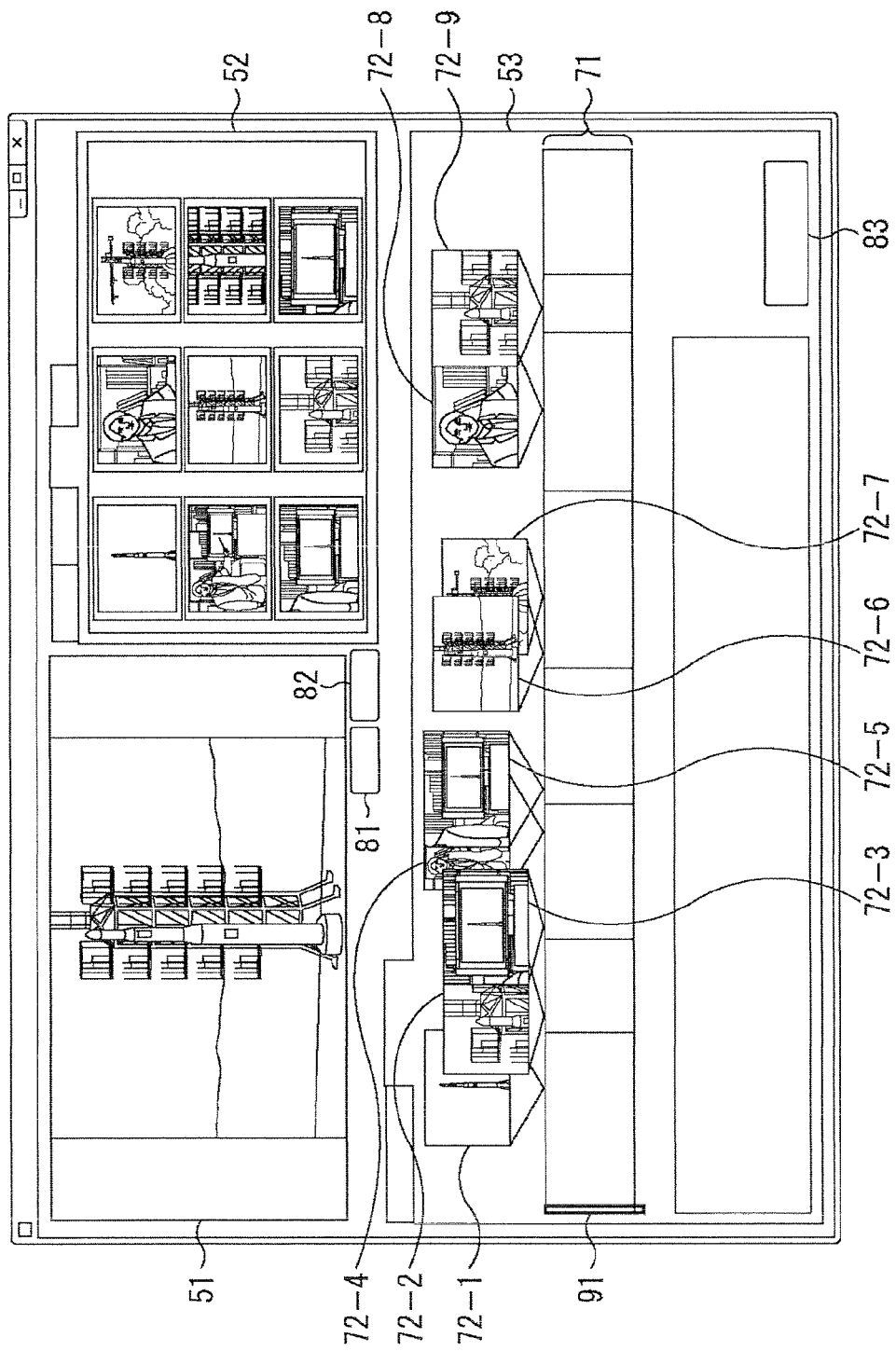
FIG. 2 is a view illustrating an example of a screen displayed based on display data output from an output unit of FIG. 1.

FIG. 2 is a view illustrating an example of a screen displayed on a display (not illustrated) or the like based on the display data output from the output unit 28.

The screen illustrated in FIG. 2 includes a moving image display unit 51. The image of content input from the content input unit 21 is to be displayed at the moving image display unit 51 as a moving image.

Further, the screen illustrated in FIG. 2 includes a representative image display unit 52. The representative images included in the metadata read from the metadata database 24 are displayed at the representative image display unit 52 as still images. In this example, nine (=three by three) of the representative images are illustrated.

Further, the screen illustrated in FIG. 2 includes a timeline display unit 53. The content is displayed on a timeline at the timeline display unit 53 so that the horizontal direction in the drawing corresponds to the time axis of the content. That is, the content is displayed as corresponding to the time axis as the left end of the timeline display unit 53 corresponding to a start time of the content and the right end of the timeline display unit 53 corresponding to an end time of the content.

Here, the content timeline displaying denotes to display a specific content so that a user can visually recognize temporal length of the content and temporal positions of inner scenes, frames and the like of the content. Here, for example, the content timeline displaying denotes displaying of the content with some method but not displaying of the content as a moving image or the like as being reproduced. For example, displaying of the content in the timeline displaying denotes that figures, waveforms, marks and the like which symbolize the content or a structural part of the content are to be displayed as being associated with the time axis.

The timeline display unit 53 includes a scene display area 71. Each scene of the content is displayed at the scene display area 71 as a rectangle having width (length) corresponding to temporal length of each scene. That is eight rectangles are displayed at the scene display area 71, so that the content is recognized as being structured with eight scenes. A start point and an end point of each scene are specified based on the information of the scene change points included in the metadata read from the metadata database 24, so that the rectangles of the scene display area 71 are displayed.

Although being displayed as white rectangles altogether in the drawing for convenience, the respective rectangles indicated at the scene display area 71 are to be displayed respectively in a representative color of each scene, for example. The representative color of a scene is to be specified as a color which corresponds to the largest pixel value in the pixel values of the whole frame existing in the scene, or the like, for example. Here, the representative color of a scene may also be specified with a method other than the above. In short, it is only required that a color which is suitable for impression of a scene is set to be the representative color.

The representative images are displayed respectively above the scene display area 71 in the drawing. That is, the nine representative images displayed at the representative image display unit 52 are to be displayed at positions respectively corresponding to frame numbers in the content.

That is, a representative image displayed at the first row and first column of the representative image display unit 52 is an image of a frame included in the first scene of the content and is displayed as a thumbnail 72-1 above the scene display area 71. Here, broken lines which indicate the frame position are provided to the thumbnail 72-1 toward the leftmost rectangle of the scene display area 71 in the drawing.

Here, owing to that broken lines are drawn from the left end part and the right end part of the thumbnail 72-1 in the drawing toward one slightly left center point of the upper part of the leftmost rectangle of the scene display area 71 in the drawing, a temporal position of a frame of the thumbnail 72-1 is indicated. That is, it is indicated that the representative image displayed at the first row and first col of the representative image display unit 52 is an image of the frame corresponding to the one slightly left center point of the leftmost rectangle of the scene display area 71 in the drawing on the time axis. In this manner, a user can easily recognize the temporal position of the representative image in the content.

Here, as long as a position of a frame of a representative image of each thumbnail can be indicated, it is possible to display with another method as well. In short, it is only required that a thumbnail can be displayed as being associated with content displayed on a timeline so that a temporal position of a representative image in content can be recognized.

Further, it is also possible that each thumbnail is generated based on data of a representative image frame or is included in metadata as being generated in advance.

A thumbnail 72-2 is recognized to indicate a representative image displayed at the second row and third column of the representative image display unit 52 and to be an image of a frame included in the second scene of the content.

A thumbnail 72-3 is recognized to indicate a representative image displayed at the third row and third column of the representative image display unit 52 and to be an image of a frame included in the third scene of the content.

Similarly, thumbnails 72-4 to 72-9 are displayed and thumbnails respectively indicating nine representative images being displayed at the representative image display unit 52 are to be displayed above the scene display area 71.

Here, for example, the respective thumbnails are displayed as being alternately superimposed. For example, the thumbnail 72-1 is superimposed to the thumbnail 72-2 and a part of the image is hidden. In a case that thumbnails are displayed as being superimposed, for example, the thumbnail superimposed above is displayed with 50% of transparence enabling a thumbnail superimposed below to be visible therethrough.

Further, for example, buttons 81 to 83 illustrated in FIG. 2 is structured as components of GUI. For example, owing to that the button 83 is operated, the thumbnails 72-1 to 72-9 are to be displayed respectively above the scene display area 71. That is, the screen illustrated in FIG. 2 is displayed at first in a state that the thumbnails 72-1 to 72-9 are not displayed, and the thumbnails 72-1 to 72-9 are to be displayed respectively above the scene display area 71 when the button 83 is operated.

The button 81 is a button for displaying a moving image at the moving image display unit 51 as reproducing the content. The button 82 is a button for stopping reproduction of the content.

In a case that the content is reproduced with the button 81, a slider 91 is configured to indicate a position of a frame which is currently reproduced at the timeline display unit 53.

Figure 3:
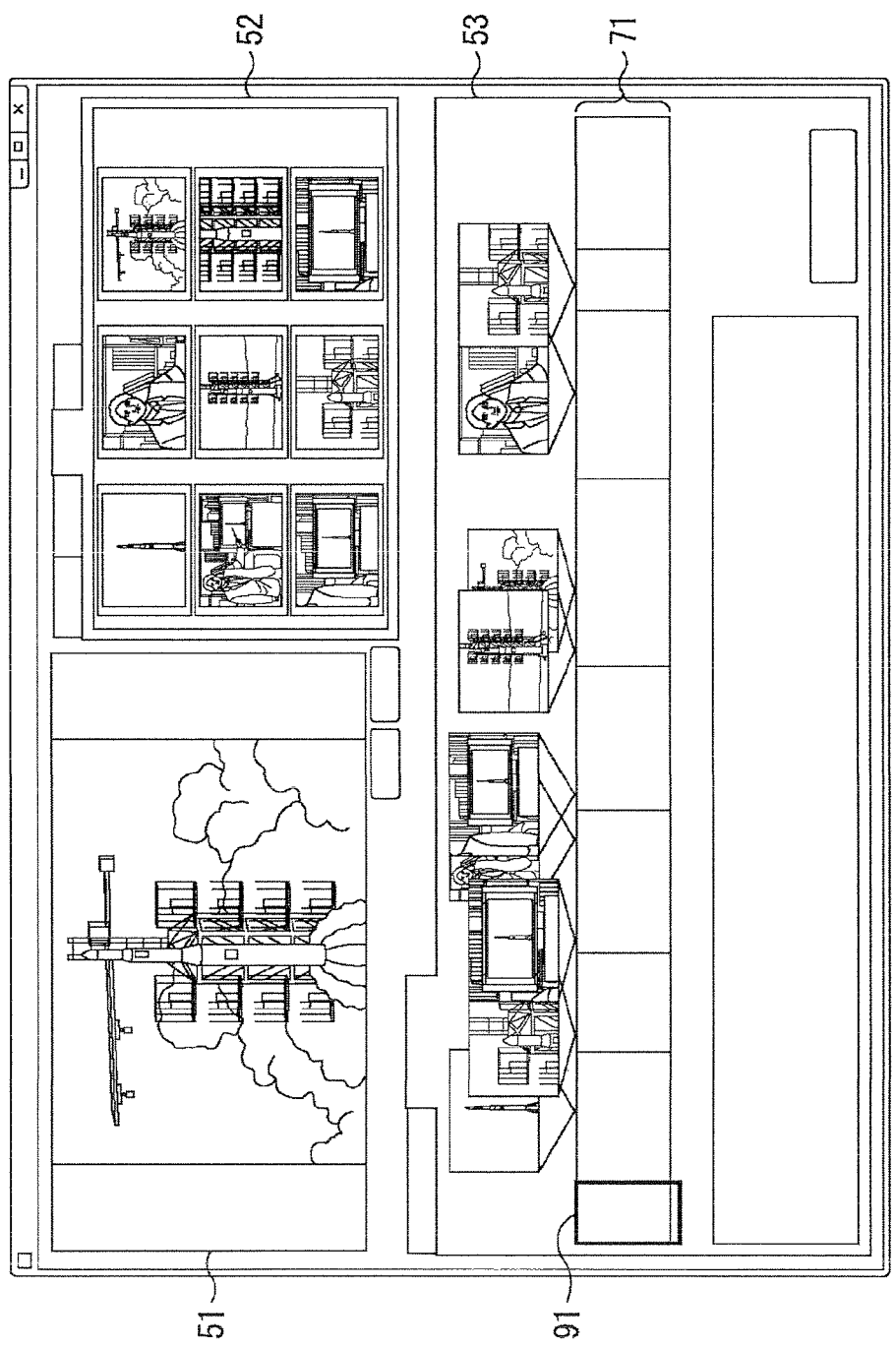
FIG. 3 is a view illustrating an example of a screen when content is reproduced at the screen illustrated in FIG. 2.

FIG. 3 is a view illustrating an example of a screen after a predetermined time is passed at the screen illustrated in FIG. 2 as the content being reproduced with operation of the button 81.

For example, the slider 91 is denoted by a red rectangular frame which is displayed as being superimposed at the scene display area 71 and is displayed to have length in the horizontal direction in the drawing be increased with time. The right end part of the slider 91 indicates the current reproducing position of the content. As illustrated in FIG. 3, owing to passing of a specific time after the content is reproduced, the right end part of the slider 91 is moved to the right side on the scene display area 71.

Figure 4:
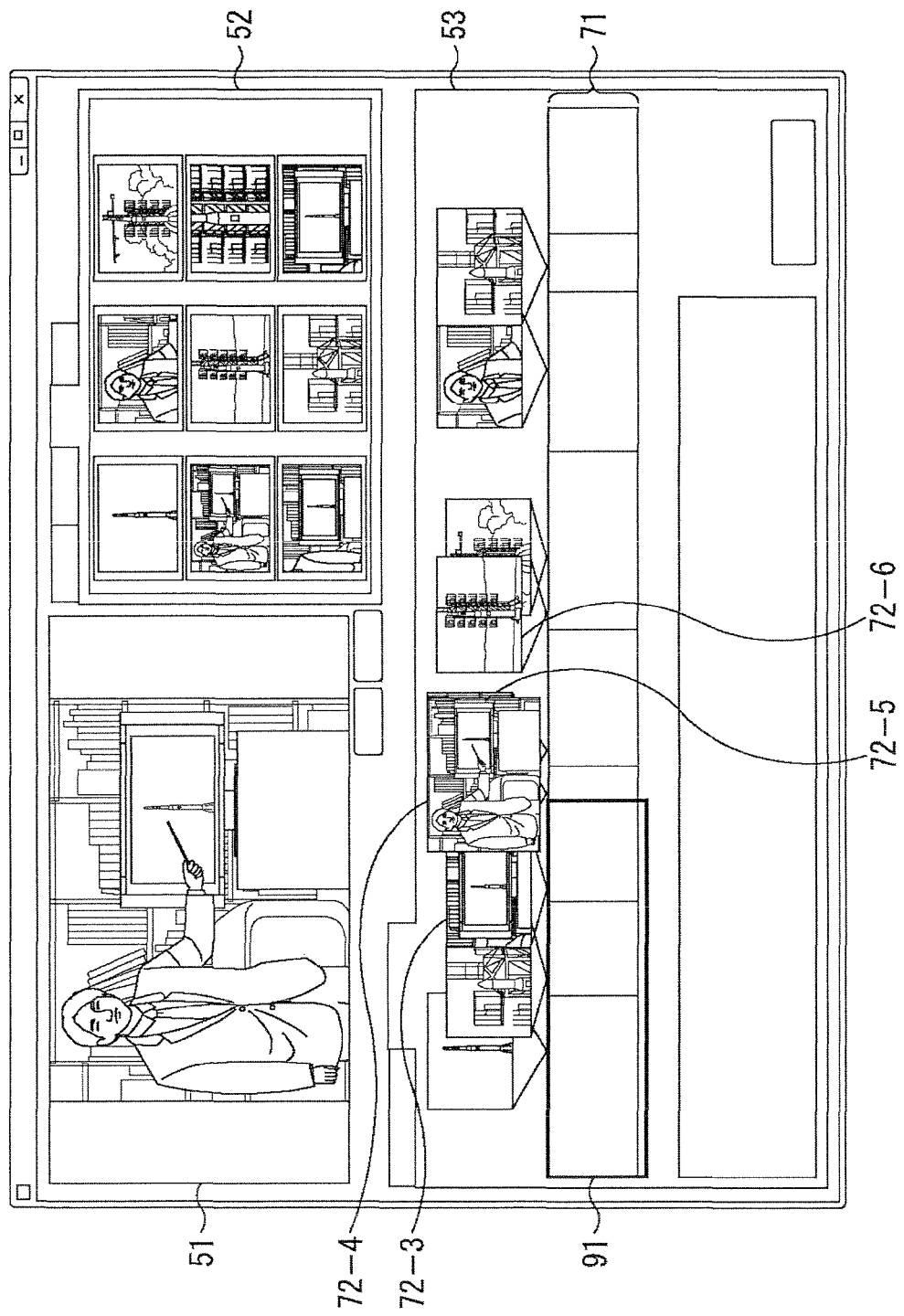
FIG. 4 is a view illustrating an example of a screen after time further passes from the state illustrated in FIG. 3.

FIG. 4 is a view illustrating an example of a screen after further time passing from the state illustrated in FIG. 3. As illustrated in the drawing, the right end part of the slider 91 is moved further to the right side on the scene display area 71 with time and is matched with a position of a frame of the representative image corresponding to the thumbnail 72-4. The thumbnail 72-4 indicates the representative image which is displayed at the second row and first column of the representative image display unit 52 and an image displayed at the moving image display unit 51 in FIG. 4 is matched with the representative image displayed at the second row and first column of the representative image display unit 52.

At that time, the thumbnail 72-4 is displayed as being enlarged to have larger display area compared to other thumbnails. Further, at that time, the thumbnail 72-4 is displayed as being superimposed on the thumbnail 72-3 and the thumbnail 72-5 with 0% of transparence. That is, the displaying is performed so that the thumbnail 72-3 and the thumbnail 72-5 are invisible therethrough.

In this manner, when the reproducing position (the right end part of the slider 91) is matched with a frame of a representative image, the thumbnail indicating the representative image is highlighted. Here, description is performed on the example that the thumbnail is highlighted owing to that the thumbnail is displayed as having enlarged display area and as being superimposed thereabove with 0% of transparence. However, it is also possible that a display state of a thumbnail is varied with another method.

In this manner, according to the present invention, details of the content can be comprehensibly displayed on a timeline. Since the respective scenes of the content and thumbnails indicating the representative images are displayed along the time axis at the timeline display unit 53, a user can previously recognize what kind of scene can be seen at what timing in a case that the content is reproduced.

Further, since the respective thumbnails are sequentially highlighted in the timeline display unit 53 while the position of the right end part of the slider 91 is moved in a case that the content is reproduced, a user can evaluate quality of content editing as focusing attention on the representative images, for example.

Figure 5:
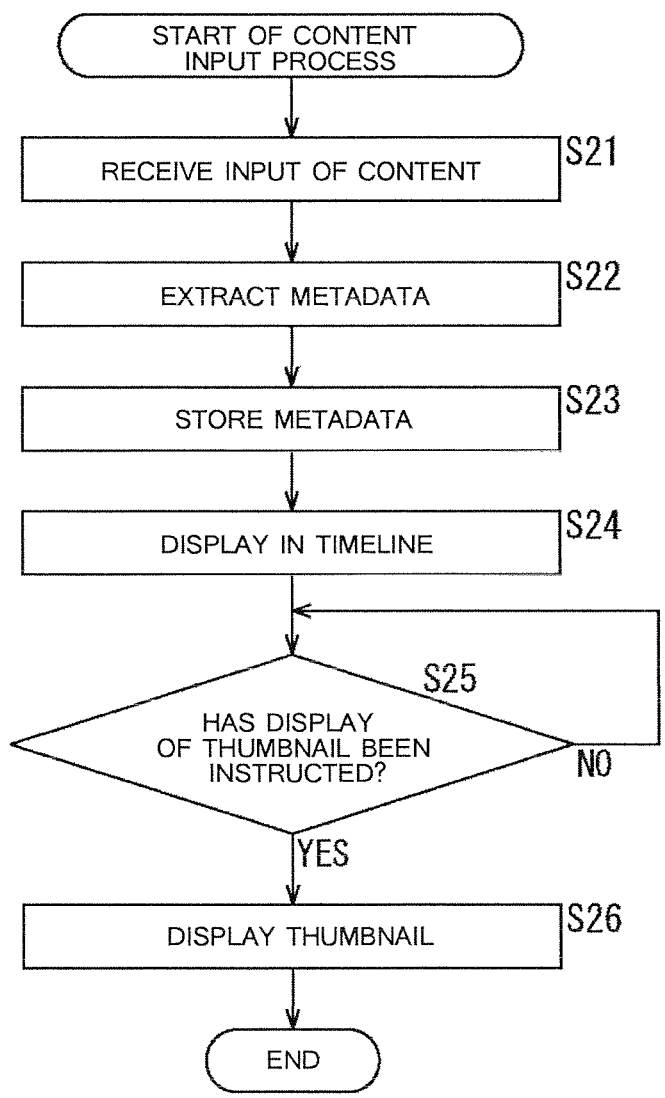
FIG. 5 is a flowchart illustrating an example of a content displaying process.

Next, an example of a content displaying process by the content processing apparatus 10 of FIG. 1 will be described with reference to a flowchart of FIG. 5.

In step S21, the content input unit 21 receives input of the data of the content.

In step S22, the metadata extracting unit 22 analyzes the data of the content supplied from the content input unit 21 and extracts metadata from the content. Here, for example, information regarding scene change points, time-related information to be required for performing timeline displaying, information of representative image and the like are extracted as the metadata.

Here, the representative images of the content included in the metadata are to be extracted with a previously determined method. Information such as data of the representative images and frame numbers of frames corresponding to the representative images are also extracted by the metadata extracting unit.

In step S23, the metadata database 24 stores the metadata extracted in the process of step S22.

In step S24, the output unit 28 reads the metadata of the content from the metadata database 24 and generates display data which is required for displaying the content on a timeline. With the above, the screen as described above with reference to FIG. 2 is displayed. Here, as described above, the screen illustrated in FIG. 2 is displayed at first in a state that the thumbnails 72-1 to 72-9 are not displayed.

In step S25, the output unit 28 determines whether or not that thumbnail displaying is instructed and waits until it is determined that the thumbnail displaying is instructed.

For example, in a case that the button 83 of FIG. 2 is operated, it is determined in step S25 that the thumbnail displaying is instructed and the processing proceeds to step S26.

In step S26, the output unit 28 generates display data required for displaying the thumbnails on the screen which corresponds to the display data generated in step S24. Accordingly, for example, the thumbnails 72-1 to 72-9 are displayed respectively above the scene display area 71.

In this manner, the content displaying process is performed.

Subsequently, to display the screens as illustrated in FIGS. 3 and 4 corresponding to operation of on-screen GUI, the output unit 28 generates display data for appropriately displaying the screens.

Next, image retrieval with the content processing apparatus 10 will be described.

As described above, the retrieval image input unit 26 is configured to receive input of a retrieval image being a still image. For example, the retrieval image being an image which is arbitrarily selected by a user is input for retrieving an image which is similar to the retrieval image out of the content input from the content input unit 21.

Figure 6:
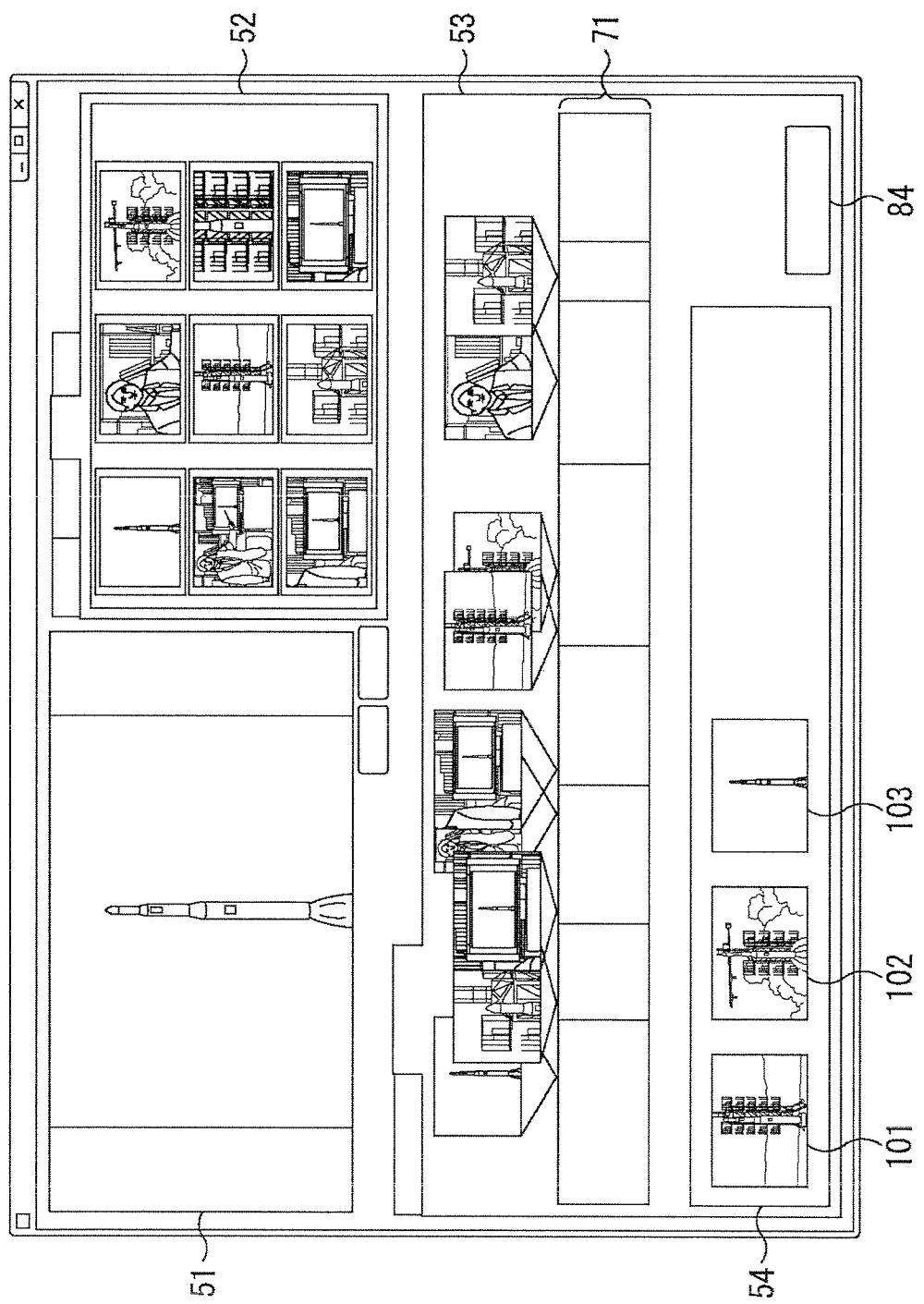
FIG. 6 is a view illustrating an example of a case of performing retrieval at the screens of FIGS. 2 to 4.

For example, FIG. 6 illustrates an example of a case of performing retrieval at the screens described above with reference to FIGS. 2 to 4. The drawing illustrates an example of retrieving a retrieval image from the same content as the content in FIGS. 2 to 4.

On the screen of FIG. 6, a retrieval image display area 54 is arranged and images 101 to 103 being retrieval images input via the retrieval image input unit 26 are displayed at the retrieval image display area 54. In this example, three representative images are selected out of the nine representative images displayed at the representative image display unit 52 to be the retrieval images.

That is, the image 101 is an image displayed at the second row and second column among the images displayed at the representative image display unit 52. The image 102 is an image displayed at the first row and third column among the images displayed at the representative image display unit 52. The image 103 is an image displayed at the first row and first column among the images displayed at the representative image display unit 52.

When a button 84 is operated in this state, images having a high similarity degree respectively to the images displayed at the retrieval image display area 54 are to be retrieved out of the content.

Figure 7:
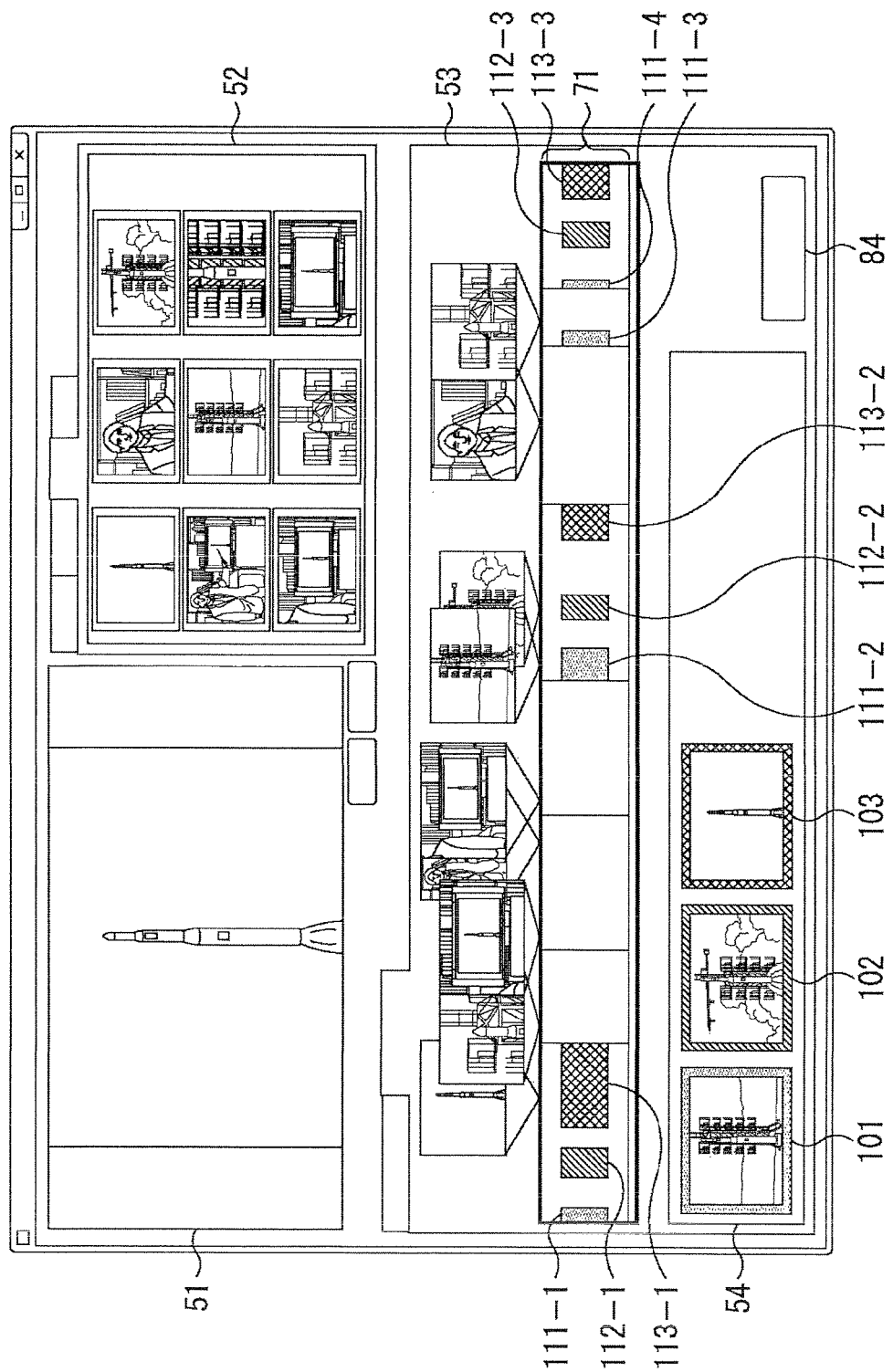
FIG. 7 is a view illustrating an example of a screen on which a retrieval result is displayed at the screen illustrated in FIG. 6.

FIG. 7 is a view illustrating an example of a screen on which a retrieval result is displayed as the button 84 being operated at the screen illustrated in FIG. 6.

As illustrated in FIG. 7, outline boxes (display frames) of the images 101 to 103 displayed at the retrieval image display area 54 are displayed in predetermined colors. Here, the predetermined colors are displayed in the drawing with difference of hatching patterns. For example, the outline box of the image 101 is displayed in blue, the outline box of the image 102 is displayed in green, and the outline box of the image 103 is displayed in red.

Further, in the example of FIG. 7, color bars indicating positions of frames of images which are similar respectively to the images 101 to 103 are displayed as being superimposed to rectangles which correspond to the respective scenes at the scene display area 71. Here, each color bar displayed in FIG. 7 indicates a plurality of frame positions to be a bar having specific width in the horizontal direction in the drawing. That is, in a case of retrieving a still image in a moving image content, a plurality of images having a high similarity degree is continuously detected in general. Accordingly, when the frame positions respectively having a high similarity degree are colored, the color bar is to be displayed.

In the drawing, color bars 111-1 to 111-4 indicate positions of frames respectively having a high similarity degree to the image 101 and is formed to be a color bar in the same color (e.g., blue) as the color of the outline box of the image 101. Further, color bars 112-1 to 112-3 indicate positions of frames respectively having a high similarity degree to the image 102 and is formed to be a color bar in the same color (e.g., green) as the color of the outline box of the image 102. Furthermore, color bars 113-1 to 113-3 indicate positions of frames respectively having a high similarity degree to the image 103 and are formed to be color bars in the same color (e.g., red) as the color of the outline box of the image 103.

With the above, a user can immediately recognize where and how long a part to display a targeted image (retrieval image) exists in the content. Further, it is possible to immediately recognize how respective parts to display a plurality of images (e.g., images 101 to 103) are combined in the content.

For example, in an example of FIG. 7, the images 101 to 103 are images of a missile. The image 101, the image 102 and the image 103 are images before missile launching, at missile launching and after missile launching, respectively. For example, in a case to report about a missile in content such as a news program, images of the missile before launching, at launching and after launching are repeatedly displayed in many cases.

According to the retrieval result illustrated in FIG. 7, it is recognized that a part to display missile images is included approximately at four positions in the content.

The first position being the first scene is a scene corresponding to the leftmost rectangle of the scene display area 71. That is, since the images of the missile before launching, at launching and after launching are displayed at parts corresponding to the color bar 111-1, the color bar 112-1 and the color bar 113-1, it is recognized that the missile images are displayed at this position.

The second position being the fifth scene is a scene corresponding to the fifth rectangle of the scene display area 71 from the left. That is, since the images of the missile before launching, at launching and after launching are displayed at parts corresponding to the color bar 111-2, the color bar 112-2 and the color bar 113-2, it is recognized that the missile images are displayed at this position.

The third position being the seventh scene is a scene corresponding to the seventh rectangle of the scene display area 71 from the left. That is, since the image of the missile before launching is displayed at a part corresponding to the color bar 111-3, it is recognized that the missile images are displayed at this position.

The fourth position being the eighth scene is a scene corresponding to the eighth rectangle of the scene display area 71 from the left. That is, since the images of the missile before launching, at launching and after launching are displayed at parts corresponding to the color bar 111-4, the color bar 112-3 and the color bar 113-3, it is recognized that the missile images are displayed at this position.

That is, it is recognized that four missile-related scenes are included in the content. Among the above, it is recognized that the images only before launching are displayed only in the seventh scene as being different from the other scenes. Further, in the first scene, the images after launching are displayed to be long as being different from the other scenes.

As described above, according to the retrieval result with the content processing apparatus 10 of the present invention, a user can immediately recognize details of the content and can evaluate an editing method of an editor of the content as well, for example.

Here, similarly to the abovementioned case, it is possible to display a moving image at the moving image display unit 51 as reproducing the content also on the screen illustrated in FIGS. 6 and 7.

Here, description is performed on a case that retrieval is performed on the screen being the same as the screen of FIGS. 2 to 4. However, it is also possible that another screen is displayed for performing image retrieval. In short, it is only required to display a screen having the retrieval image display area 54 and the timeline display unit 53 in FIG. 7.

With FIG. 7, description is performed on an example to perform image retrieval for one content. However, it is also possible to perform image retrieval for a plurality of pieces of content.

Figure 8:
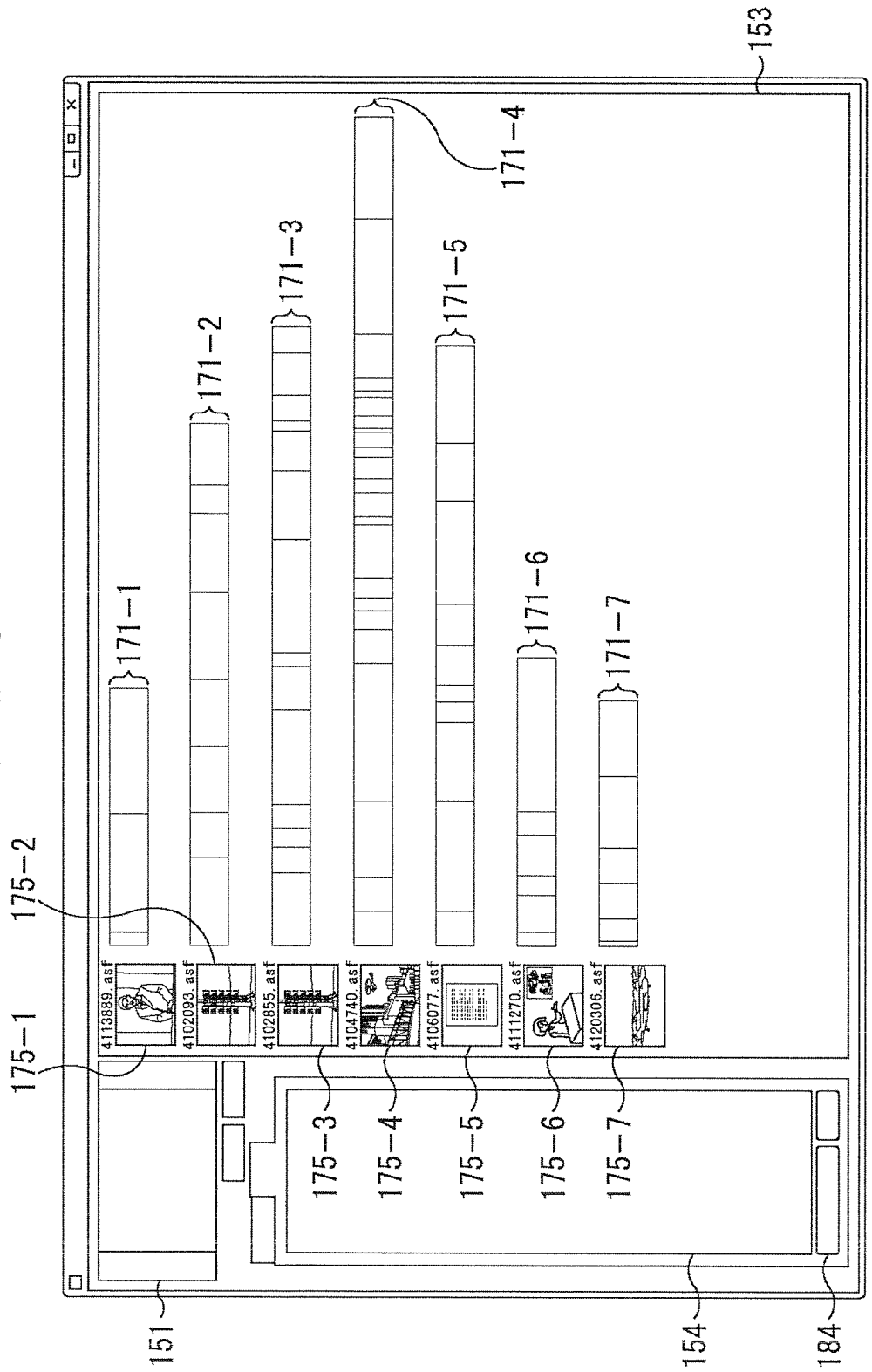
FIG. 8 is a view illustrating an example of a screen in a case of performing retrieval for a plurality of pieces of content.

FIG. 8 is a view illustrating an example of a screen displayed with display data generated by the output unit 28 of the content processing apparatus 10 of FIG. 1 in a case that image retrieval is performed for a plurality of pieces of content.

Here, in a case of performing image retrieval for a plurality of pieces of content, input of the plurality of pieces of content is previously received by the content input unit 21 of FIG. 1 and extraction of metadata and extraction of image feature quantity are performed on the respective content. Further, in a case of performing image retrieval for a plurality of pieces of content, the metadata stored in the metadata database 24 and the image feature quantity stored in the image feature quantity database can be read based on content identification information, for example.

A moving image display unit 151, a timeline display unit 153 and a retrieval image display area 154 are arranged on a screen of FIG. 8. In an example of FIG. 8, seven content are displayed in a timeline at the timeline display unit 153.

The timeline display unit 153 includes scene display areas corresponding to the number of content to be targets of retrieval. In this example, the timeline display unit 153 includes scene display areas 171-1 to 171-7.

Each scene of each content is displayed as a rectangle having width (length) corresponding to temporal length of the each scene at each of the scene display areas 171-1 to 171-7. For example, three rectangles are displayed at the scene display area 171-1 and the content is recognized as being structured with three scenes. Here, a start point and an end point of each scene are specified based on information of scene change points included in the metadata read from the metadata database 24, so that rectangles of the scene display areas 171-1 to 171-7 are displayed.

The respective rectangles indicated at the scene display areas 171-1 to 171-7 are to be displayed respectively in a representative color of each scene (as being displayed in white altogether in the drawing for convenience), for example. The representative color of a scene is to be specified as a color which corresponds to the largest pixel value in the pixel values of the whole frame existing in the scene, or the like, for example. Here, the representative color of a scene may also be specified with a method other than the above. In short, it is only required that a color which is suitable for impression of a scene is set to be the representative color.

Further, in the timeline display unit 153, still image display areas 175-1 to 175-7 are arranged respectively at the left side in the drawing of the scene display areas 171-1 to 171-7. Each of images to be displayed at the still image display areas 175-1 to 175-7 is to be an image of the top frame, a predetermined representative image or the like of each content, for example. Further, text strings described in the drawing above the images displayed at the still image display areas 175-1 to 175-7 indicate identification information of the respective content, for example.

A moving image obtained as reproducing content selected by a user out of the content which are displayed in a timeline at the timeline display unit 153 is displayed at the moving image display unit 151.

A retrieval image having input thereof received by the retrieval image input unit 26 is to be displayed at the retrieval image display area 154. Here, in the example of FIG. 8, the retrieval image is not input yet and the retrieve image is not displayed at the retrieval image display area 154. For example, the retrieval image being an image which is arbitrarily selected by a user is input for retrieving an image which is similar to the retrieval image out of the content displayed in a timeline at the timeline display unit 153.

When the retrieval image is input and a button 184 structured as a component of GUI is operated in this state, images having a high similarity degree respectively to the images displayed at the retrieval image display area 154 are to be retrieved out of the content.

Figure 9:
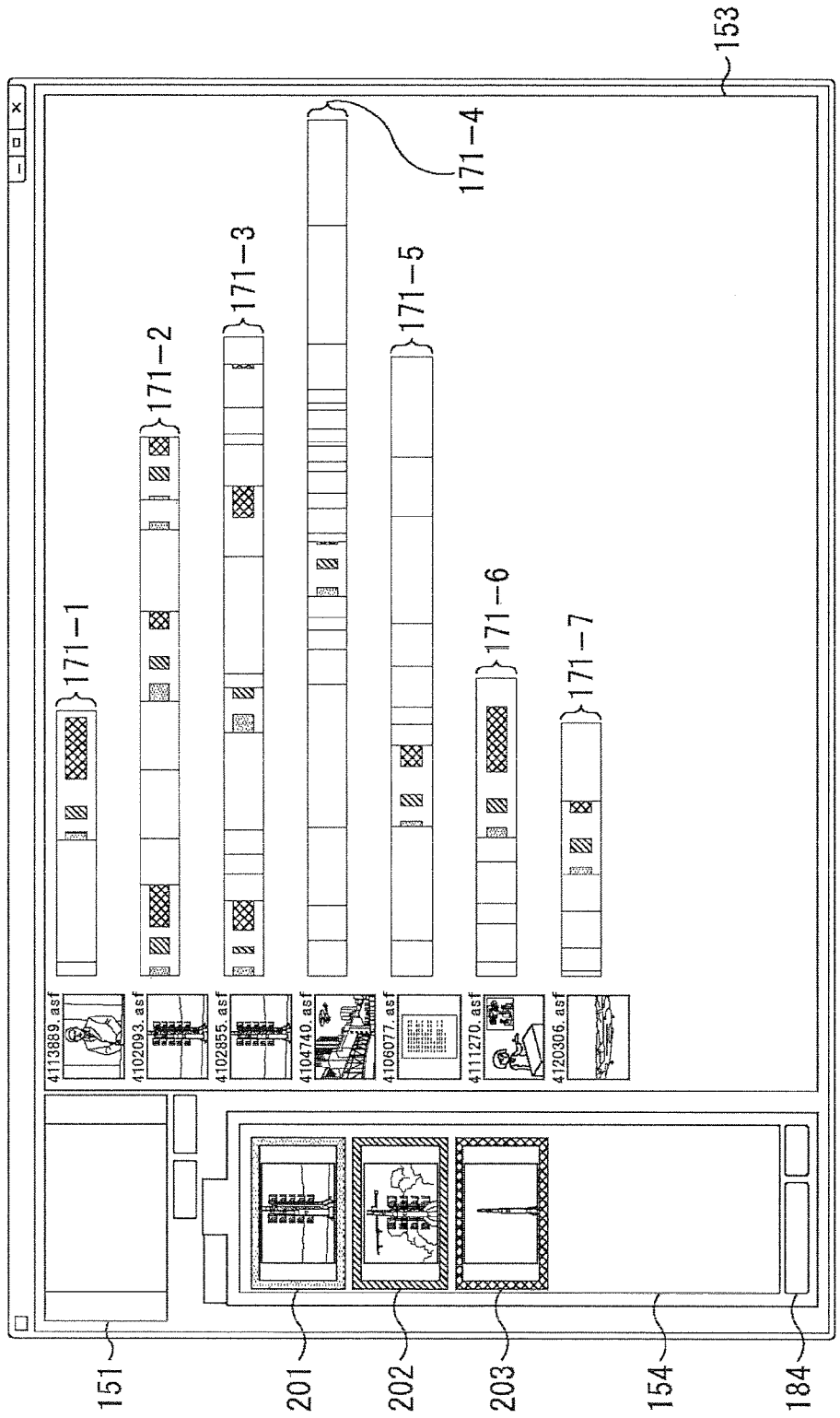
FIG. 9 is a view illustrating an example of a screen on which a retrieval result is displayed at the screen illustrated in FIG. 8.

FIG. 9 is a view illustrating an example of a screen on which a retrieval result is displayed after images 201 to 203 is input as the retrieval images and the button 184 is operated on the screen illustrated in FIG. 8.

As illustrated in FIG. 9, outline boxes of the images 201 to 203 displayed at the retrieval image display area 154 are displayed in predetermined colors. In the drawing, the predetermined colors are displayed with difference of hatching difference.

Further, in the example of FIG. 9, color bars indicating positions of frames of images which are similar respectively to the images 201 to 203 are displayed as being superimpose to rectangles which correspond to the respective scenes at the scene display areas 171-1 to 171-7. Here, similarly to a case described above with reference to FIG. 7, each color bar displayed in FIG. 9 indicates a plurality of frame positions to be a bar having specific width in the horizontal direction in the drawing. That is, in a case of retrieving a still image in a moving image content, a plurality of images having a high similarity degree is continuously detected in general. Accordingly, when the frame positions respectively having a high similarity degree are colored, the color bar is to be displayed.

In the drawing, a color bar 211 indicates a position of a frame having a high similarity degree to the image 201 and is formed to be a color bar in the same color (e.g., blue) as the color of the outline box of the image 201. Further, a color bar 212 indicates a position of a frame having a high similarity degree to the image 202 and is formed to be a color bar in the same color (e.g., green) as the color of the outline box of the image 202. Furthermore, a color bar 213 indicates a position of a frame having a high similarity degree to the image 203 and is formed to be a color bar in the same color (e.g., red) as the color of the outline box of the image 203.

Here, in the example of FIG. 9, although a reference sign is provided only to the color bar displayed at the scene display area 171-1, color bars are displayed at the scene display areas 171-2 to 171-7. That is, in the example of FIG. 9, a retrieval result being similar to the case described with reference to FIG. 7 can be obtained for each of the plurality of pieces of content (seven in this example).

With the above, a user can immediately recognize where and how long a part to display a targeted image (retrieve image) exists in the plurality of pieces of content. Further, it is possible to immediately recognize how respective parts to display a plurality of images (e.g., images 101 to 103) are combined in the content. Then, it becomes also possible to compare edited details of the respective content, for example, by displaying the retrieval results on a single screen.

Figure 10:
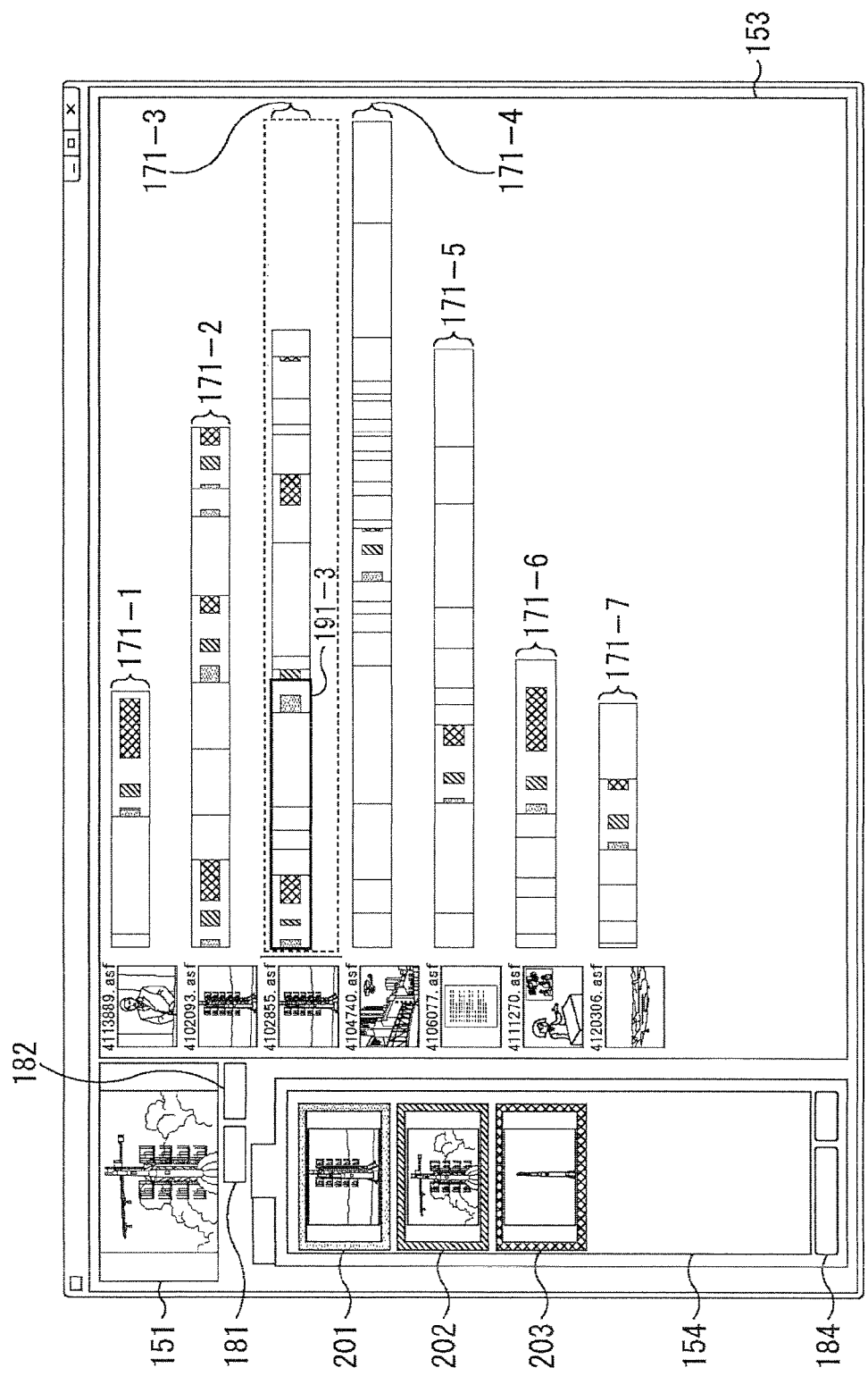
FIG. 10 is a view illustrating an example of a screen when content is reproduced at the screen illustrated in FIG. 9.

Further, as described above, the moving image obtained as reproducing the content selected by a user out of the content which are displayed in a timeline at the timeline display unit 153 is displayed at the moving image display unit 151. FIG. 10 is a view illustrating an example of a screen in a case that the moving image is displayed at the moving image display unit 151. In the example of FIG. 10, the scene display area 171-3 is selected by a user by using a pointing device (not illustrated) or the like and the content is reproduced as operating the button 181.

Here, a button 181 structured as a component of GUI is a button for displaying a moving image at the moving image display unit 151 as reproducing the content. A button 182 is a button for stopping reproduction of the content. Further, in the example of the drawing, owing to that the scene display area 171-3 is selected, a periphery of the scene display area 171-3 is highlighted. In this example, highlighting is indicated by illustrating the periphery of the scene display area 171-3 with a broken line.

Further, in a case that the content is reproduced with the button 181, a slider is configured to indicate a position of a frame which is currently reproduced at the timeline display unit 153. In the example of the drawing, since the content of the scene display area 171-3 is reproduced, a slider 191-3 is displayed.

For example, the slider 191-3 is denoted by a red rectangular frame which is displayed as being superimposed at the scene display area 171-3 and is displayed to have length in the horizontal direction in the drawing be increased with time. The right end part of the slider 191-3 indicates the current reproducing position of the content. Owing to passing of a specific time after the content is reproduced, the right end part of the slider 191-3 is moved to the right side on the scene display area 171-3.

Here, in the example of FIG. 10, since the content of the scene display area 171-3 is reproduced, the slider 191-3 is displayed. When another content is reproduced, a slider is to be displayed on the scene display area of the content.

In this manner, it is also possible to display as reproducing the content while displaying the retrieval result.

Figure 11:
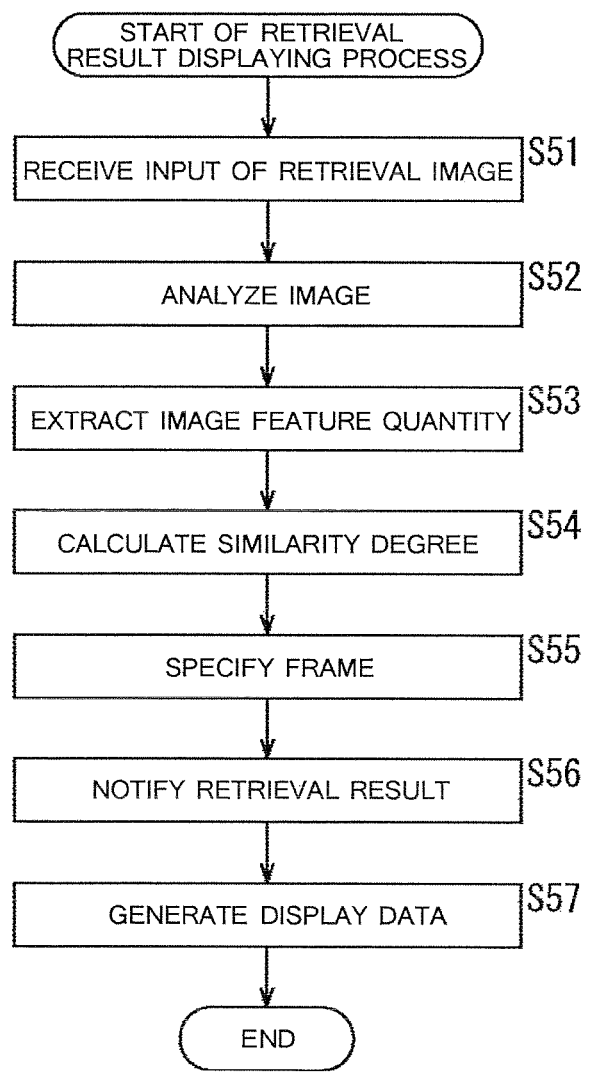
FIG. 11 is a flowchart illustrating a retrieval result displaying process.

Next, an example of a retrieval result displaying process due to the content processing apparatus 10 of FIG. 1 will be described with reference to a flowchart of FIG. 11. Here, prior to this process, input of one or a plurality of pieces of content is previously received by the content input unit 21 and extraction of metadata and extraction of image feature quantity are performed on the respective content.

In step S51, the retrieval image input unit 26 receives input of the retrieval image. Here, for example, the retrieval image is an image (still image) which is arbitrarily selected by a user and is input for retrieving images similar to the retrieval image out of the content input from the content input unit 21. At that time, for example, the images 101 to 103 of FIG. 6 are input as the retrieval images.

In step S52, the image feature quantity extracting unit 23 analyzes the retrieval image input in step S51.

In step S53, the image feature quantity extracting unit 23 extracts image feature quantity of the retrieval image as a result of the process of Fig. S51.

In step S54, the retrieving unit 27 compares the image feature quantity of the retrieval image extracted by the image feature quantity extracting unit 23 in the process of step S53 and the image feature quantity stored in the image feature quantity database 25 with a predetermined method. Accordingly, the similarity degree between the image feature quantity of the retrieval image and image feature quantity of each still image by the amount of one frame structuring the content stored in the image feature quantity database 25 is to be calculated as a numerical value.

In step S55, for example, the retrieving unit 27 specifies a frame of a still image having a value of the similarity degree to the image feature quantity of the retrieval image being a predetermined threshold value or larger.

In step S56, the retrieving unit 27 notifies the retrieval result to the output unit 28. At that time, the frame number and the like of the still image which is specified as a result of the process of step S55 are supplied to the output unit 28.

In step S57, the output unit 28 reads metadata of the content from the metadata database 24 and generates display data which is required for displaying the retrieval result on a timeline based on the frame number of the still image supplied in the process of step S56 and the read metadata. Accordingly, for example, the screen as described above with reference to FIG. 7 or FIG. 9 is displayed.

Subsequently, the output unit 28 appropriately generates display data in accordance with operation and the like of GUI on the screen.

In this manner, the retrieval result displaying process is performed.

Owing to referring to the screen obtained as a result of the abovementioned retrieval result displaying process, it is possible to immediately recognize where and how long a part to display a targeted image (retrieval image) exists in the content. Along with the above, owing to referring to the screen obtained as a result of the abovementioned retrieval result displaying process, it is possible to detect occurrence of a predetermined event in the content.

For example, owing to that a plurality of retrieval images are retrieved and that the detected order of frames which are similar to the retrieval images is identified, it becomes possible to approximately recognize what event occurs at which part of the content.

Figure 12:
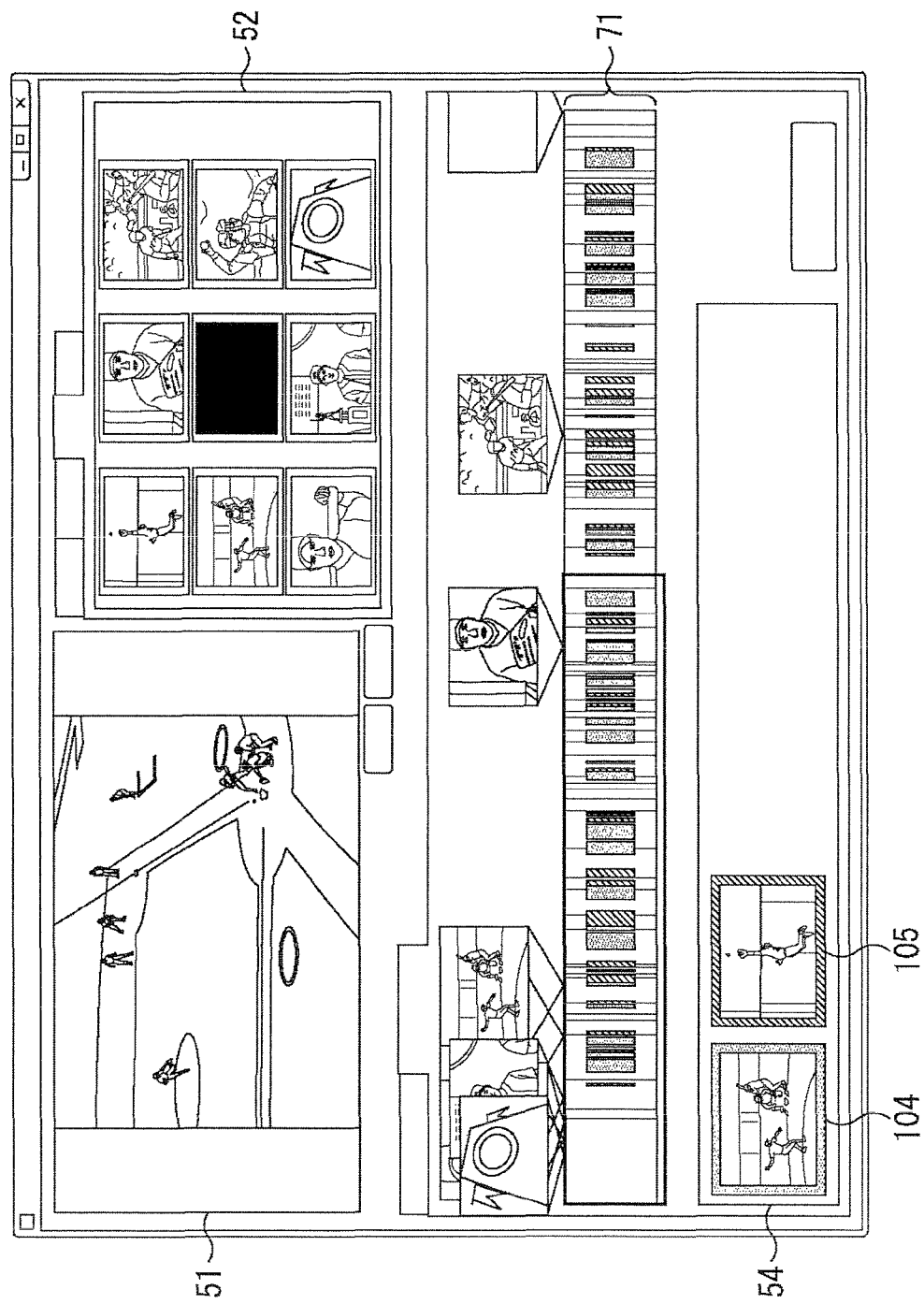
FIG. 12 is a view illustrating another example of a screen on which a retrieval result is displayed.

Similarly to the abovementioned screen with reference to FIG. 7, FIG. 12 is a view illustrating an example of a screen which displays a result of retrieving retrieval images for a certain content. In this example, content of a baseball broadcast program is retrieved and displayed on a timeline.

In the example of FIG. 12, images 104 and 105 are displayed at the retrieval image display area 54. In this example, two representative images are selected out of the nine representative images displayed at the representative image display unit 52 to be the retrieval images.

Further, outline boxes of the images 104 and 105 displayed at the retrieval image display area 54 are displayed in predetermined colors. For example, the outline box of the image 104 is displayed in blue and the outline box of the image 105 is displayed in green. Here, the predetermined colors are indicated in the drawing with difference of hatching patterns.

Further in the example of the drawing, color bars indicating positions of frames of images which are similar respectively to the images 104 and 105 are displayed as being superimposed to rectangles which correspond to the respective scenes at the scene display area 71. Here, color bars illustrated in FIG. 12 are formed to be color bars respectively in the same color as the color of the outline box of the image 104 or as the color of the outline box of the image 105.

In the example of FIG. 12, the image 104 is an image of a pitcher pitching and the image 105 is an image of an outfielder running (jumping to a ball). Accordingly, at positions of the scene display area 71 where the color bars indicating frames of images which are similar to the image 104 are displayed and the color bars indicating frames of images which are similar to the image 105 at the right side thereof, it is recognized that a batted ball flies to an outfield.

For example, if an image 106 of a runner on the first base is retrieved in addition to the images 104 and 105 and a position where color bars of images which are similar to the images 104, 105 and 106 appear in order is found, it is recognized that a batter hits a single at the position.

For example, if an image 107 of a runner on the second base is retrieved in addition to the images 104 and 105 and a position where color bars of images which are similar to the images 104, 105 and 107 appear in order is found, it is recognized that a batter hits a double at the position.

At that time, owing to referring to the respective rectangles (respective scenes) displayed at the scene display area 71 and thumbnails displayed thereabove, for example, details of the content can be recognized more easily.

In this manner, by combining images of pitching, fielding and base-running as the retrieval images, it becomes possible to easily find where a single occurs and where a double occurs in the content. That is, owing to retrieving a plurality of retrieval images with appropriate combination and identifying detected temporal positions and detected order of frames which are similar to the retrieval images, it becomes possible to recognize what event occurs at which part of the content.

As described above, according to the present invention, visualized displaying of content details which cannot be supported by the related art can be performed. Accordingly, content details of a moving image can be recognized more easily.

Further, owing to retrieving a plurality of retrieval images with appropriate combination and displaying frames which are similar to the retrieval images, for example, content of a program before being broadcasted can be evaluated in advance.

For example, following is a case that images of a commodity a of a program sponsor A, a commodity b of a program sponsor B and a commodity c of a program sponsor C are inevitably required to be included in content. In such a case, unbalance among the program sponsors A to C can be corrected by retrieving the images of the commodities a to c and comparing lengths of color bars of frames which are similar to the retrieval images. Further, in a case of existing of difference among contribution amounts of the program sponsors A to C, intentions of the program sponsors can be appropriately reflected to the content by retrieving the images of the commodities a to c and comparing lengths and order of the color bars of the frames which are similar to the retrieval images.

As described above, according to the present invention, comparison of content details which cannot be supported by the related art can be performed. Accordingly, content details of a moving image can be recognized more easily.

In the above, the content is displayed on a timeline as the horizontal direction in the drawing being associated with the time axis on the display screen due to the content processing apparatus 10. However, it is also possible to display the content on a timeline as the vertical direction in the drawing being associated with the time axis.

Here, the abovementioned series of processes may be performed with hardware or may be performed with software. In a case to perform the abovementioned series of processes with software, programs configuring the software are installed from a network or a recording medium to a computer which is assembled in dedicated hardware. Further, owing to installing a variety of programs, installing is performed from a network or a recording medium to a general-purpose personal computer 700 capable of performing various functions, for example, as illustrated in FIG. 13.

Figure 13:
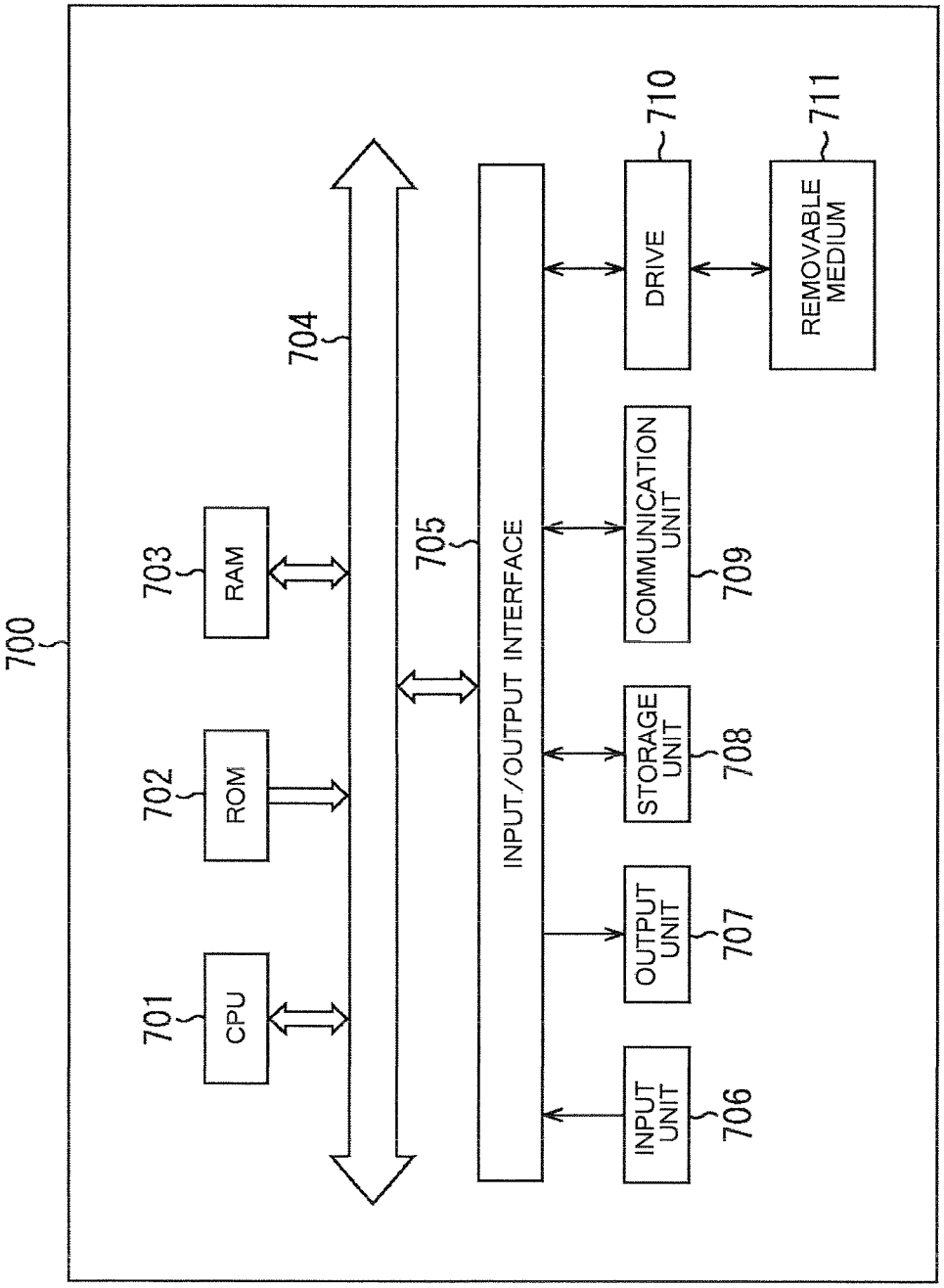
FIG. 13 is a block diagram illustrating a structural example of a personal computer.

In FIG. 13, a central processing unit (CPU) 701 performs a variety of processes in accordance with a program stored in a read only memory (ROM) 702 or a program loaded from a storage unit 708 to a random access memory (RAM) 703. Further, data and the like necessary for the CPU 701 to perform a variety of processes are appropriately stored in the RAM 703.

The CPU 701, the ROM 702 and the RAM 703 are mutually connected via a bus 704. An input/output interface 705 is connected to the bus 704 as well.

An input unit 706 including a keyboard, a mouse and the like and an output unit 707 including a display such as a liquid crystal display (LCD), a speaker and the like are connected to the input/output interface 705. Further, the storage unit 708 including a hard disk and the like, a communication unit 709 including a network interface card such as a modem and a LAN card, and the like are connected to the input/output interface 705. The communication unit 709 performs a communication process via a network including the Internet.

Further, a drive 710 is connected to the input/output interface 705 as required and a removal medium 711 such as a magnetic disc, an optical disc, a magnetic-optical disk or a semiconductor memory is appropriately attached thereto. Then, a computer program read from the removal media is installed to the storage unit 708 as required.

In a case that the abovementioned series of processes are performed with software, the programs configuring the software are installed from a network such as the Internet and recording media such as the removal medium 711.

Here, in addition to a medium configured with the removal medium 711 illustrated in FIG. 13 including a magnetic disk (including a floppy disk (registered trademark)), an optical disk (including a compact disk-read only memory (CD-ROM) and a digital versatile disk (DVD)), a magnetic-optical disk (including a mini-disk (MD) (registered trademark)) or a semiconductor memory to which programs are recorded to be distributed for delivering programs to a user as being separated from an apparatus body, the recording media include the program-recorded ROM 702 and a medium configured with a hard disk provided in the storage unit 708 which are delivered to the user in a state of being previously assembled to the apparatus body.

Here, the abovementioned series of processes in the present application includes a process which is performed in parallel or separately not necessarily being sequentially performed as well as a process which is sequentially performed along the described order.

Further, not limited to the abovementioned embodiments, the embodiments of the present invention may be variously modified without departing from scope of the invention.

REFERENCE SIGNS LIST

10 Content processing apparatus
21 Content input unit
22 Metadata extracting unit
23 Image feature quantity extracting unit
24 Metadata database
25 Image feature quantity database
26 Retrieval image input unit
27 Retrieving unit
28 Output unit

The invention claimed is:

1. A content retrieval apparatus, comprising:
retrieval image input means which receives input of a plurality of retrieval images being still images;
image feature quantity extracting means which extracts image feature quantity of each of the plurality of retrieval images with a predetermined method;
similarity degree calculation means which calculates a similarity degree of content of a moving image between the image feature quantity previously extracted from a still image of a frame structuring the content and the image feature quantity of each of the retrieval images;
specifying means which specifies a frame of the still image being similar to each of the retrieval images by comparing the calculated similarity degree with a predetermined threshold value; and
timeline displaying means which generates display data for performing timeline displaying by displaying the content on a time axis along with information indicating a temporal position of the frame of the still image being similar to each of the retrieval images based on the specified frame and metadata which is previously extracted from the content,
wherein the timeline displaying means generates display data for displaying a screen having a retrieval image display unit which displays a list of the plurality of retrieval images and a timeline display unit which displays the content on a timeline,
the plurality of retrieval images are displayed at the retrieval image display unit while being surrounded respectively by display frames in mutually different colors, and
information indicating a temporal position of the frame of the still image being similar to each of the retrieval images is displayed at the timeline display unit as a color bar in a same color as a color of the display frame.

2. The content retrieval apparatus according to claim 1, wherein the timeline displaying means displays each of a plurality of pieces of content with the timeline displaying at the timeline display unit on a single screen, and
information indicating a temporal position of the frame of the still image being similar to each of the retrieval images for each of the plurality of pieces of content is displayed as a color bar in the same color as the color of the display frame.

3. The content retrieval apparatus according to claim 1, wherein the timeline displaying means generates display data for displaying a screen further having a moving image display unit which displays a moving image obtained by reproducing the content in a case that reproduction of the content displayed with the timeline displaying is instructed.

4. The content retrieval apparatus according to claim 1, wherein the timeline displaying means specifies scenes structuring the content based on information of scene change points of the content included in the metadata, and displays the content on a timeline in such a manner that figures indicating the respective scenes are displayed while being associated with temporal length of the scenes, with the horizontal or vertical direction of a screen being the time axis.

5. The content retrieval apparatus according to claim 4, wherein the timeline displaying means displays the content on a timeline while the figures indicating the scenes are displayed respectively in representative color of the scenes specified with a predetermined method.

6. A content retrieval method, comprising the steps of:
receiving input of a plurality of retrieval images being still images with retrieval image input means;
extracting image feature quantity of each of the plurality of retrieval images with a predetermined method with image feature quantity extracting means;
calculating a similarity degree of content of a moving image between the image feature quantity previously extracted from a still image of a frame structuring the content and the image feature quantity of each of the retrieval images with similarity degree calculation means;
specifying a frame of the still image being similar to each of the retrieval images by comparing the calculated similarity degree with a predetermined threshold value with specifying means; and
generating display data for performing timeline displaying by displaying the content on a time axis along with information indicating a temporal position of the frame of the still image being similar to each of the retrieval images based on the specified frame and metadata which is previously extracted from the content with timeline displaying means,
wherein the generated display data displaying a screen having a retrieval image display unit which displays a list of the plurality of retrieval images and a timeline display unit which displays the content on a timeline,
the plurality of retrieval images are displayed at the retrieval image display unit while being surrounded respectively by display frames in mutually different colors, and
information indicating a temporal position of the frame of the still image being similar to each of the retrieval images is displayed at the timeline display unit as a color bar in a same color as a color of the display frame.

7. A computer program embodied on a non-transitory computer readable medium for causing a computer to function as a content retrieval apparatus, the apparatus comprising:
retrieval image input means which receives input of a plurality of retrieval images being still images;
image feature quantity extracting means which extracts image feature quantity of each of the plurality of retrieval images with a predetermined method;
similarity degree calculation means which calculates a similarity degree of content of a moving image between the image feature quantity previously extracted from a still image of a frame structuring the content and the image feature quantity of each of the retrieval images;
specifying means which specifies a frame of the still image being similar to each of the retrieval images by comparing the calculated similarity degree with a predetermined threshold value; and
timeline displaying means which generates display data for performing timeline displaying by displaying the content on a time axis along with information indicating a temporal position of the frame of the still image being similar to each of the retrieval images based on the specified frame and metadata which is previously extracted from the content,
wherein the timeline displaying means generates display data for displaying a screen having a retrieval image display unit which displays a list of the plurality of retrieval images and a timeline display unit which displays the content on a timeline, the plurality of retrieval images are displayed at the retrieval image display unit while being surrounded respectively by display frames in mutually different colors, and information indicating a temporal position of the frame of the still image being similar to each of the retrieval images is displayed at the timeline display unit as a color bar in a same color as a color of the display frame.

* * * * *